United States Patent [19]
Raque

[11] Patent Number: 5,915,521
[45] Date of Patent: Jun. 29, 1999

[54] RANDOM INDEXING AND LIFTING APPARATUS

[75] Inventor: Glen F. Raque, Louisville, Ky.

[73] Assignee: Raque Food Systems, Inc., Louisville, Ky.

[21] Appl. No.: 08/308,377

[22] Filed: Sep. 19, 1994

[51] Int. Cl.⁶ ................................................. B66B 21/00
[52] U.S. Cl. ........................................... 198/326; 198/461
[58] Field of Search ............................... 198/461.1, 46.3, 198/461.2; 1/326, 330, 331, 332

[56] References Cited

U.S. PATENT DOCUMENTS

| | | | |
|---|---|---|---|
| 683,039 | 9/1901 | Hagen | 198/461.3 |
| 2,345,870 | 4/1944 | Guenther | 198/461.2 |
| 2,747,719 | 5/1956 | Ruttkay | 198/461.1 |
| 4,325,477 | 4/1982 | Heikinheimo | 198/461.1 |
| 4,354,590 | 10/1982 | Langen | 198/461.2 |
| 4,569,433 | 2/1986 | Ishida et al. | 198/326 |

*Primary Examiner*—William E. Terrell
*Assistant Examiner*—Tamara Kelly
*Attorney, Agent, or Firm*—Bose McKinney & Evans

[57] ABSTRACT

An apparatus is provided for indexing and lifting items from a first conveyer in a first plane and transferring such items to a second conveyor in a second plane it a different level than the first plane. The apparatus includes a transfer assembly for moving the items longitudinally from the first conveyer to the second conveyer. The apparatus also includes at least two longitudinally spaced-apart posts, each post having a top surface. The top surfaces of the posts cooperate to support an item. Connectors connect the posts to the transfer assembly and frame members mount the transfer assembly between the first and second conveyers at an angle relative to at least one of the first and second planes. The posts are configured so that when the transfer assembly is mounted at the angle, the top surfaces are in a single plane which is parallel to at least one of the first and second planes of the first and second conveyors. A drive mechanism is provided for driving the transfer assembly to move the items from the first conveyor to the second conveyor while maintaining the items parallel to one of the first and second planes.

16 Claims, 10 Drawing Sheets

RANDOM INDEXING AND LIFTING APPARATUS

BACKGROUND AND SUMMARY OF THE INVENTION

The present invention relates to apparatus for conveying items from an upstream end to a downstream end of a conveyor system. More particularly, the present invention relates to an indexing and lifting apparatus which accepts randomly spaced items from the upstream end of a conveyor system, indexes the items for processing, and lifts and transfers such items from a first conveyor in a first plane to a second conveyor in a second plane.

Generally speaking, items traveling along a conveyor system are positioned on the conveyor system with random spacing between the items. In some situations it is desirable that the randomly spaced items be indexed so that each item is separately delivered a desired distance apart or at a desired time in order to be processed downstream in the conveyor system. A conveyor system may include a first conveyor and a second conveyor which move items in planes that are at different levels. Thus it may be desirable to index items and to transfer them from the first conveyor in a first plane to a second conveyor in a second plane. In order to transfer items between the different conveyors in a system, items moving along the first conveyor may need to be "primed," i.e., indexed before being fed onto the second conveyor.

While apparatus currently exists for indexing randomly spaced items on a conveyor system so that they are timely delivered at desired spacing therebetween, no apparatus currently exists for both indexing and lifting randomly spaced items from a first conveyor in a first plane to a second conveyor in a second plane. Therefore, a need exists for an apparatus combining both indexing and lifting functions.

According to the present invention, an apparatus for indexing and lifting randomly spaced items from a first conveyor in a first plane and transferring such items to a second conveyor in a second plane at a different level than the first plane is provided. The apparatus includes a transfer assembly and members for mounting the transfer assembly at an angle relative to one of the first and second planes of the first and second conveyors so that items are transferred from one plane to the other. The apparatus further includes posts that are connected to the transfer assembly for supporting and carrying the items. The posts are connected to the transfer assembly and are configured so the top surfaces of the posts are in a single plane which is parallel to at least one of the first and second planes of the first and second conveyors. One of the posts is a leading post and the other post is a trailing post. The trailing post includes a stop for engaging an item received from the first conveyor in order to index items as they are transferred from the first conveyor and to lift such items to the second conveyor.

Further in accordance with the present invention, an apparatus for indexing and lifting randomly spaced items from a first conveyor in a first plane to a second conveyor in a second plane includes both an indexing assembly for indexing items while they are moving on the first conveyor and a lifting assembly for lifting the indexed items from the first conveyor to a second conveyor in a plane different than the plane of the first conveyor. The indexing assembly serves to "prime" the items while on the first conveyor before they are fed onto the lifting assembly. The indexing assembly comprises a transfer assembly, a plurality of lugs, and pivot connectors for pivotally connecting the lugs to the transfer assembly. The lugs are connected to the transfer assembly in a spaced relationship that is less than a longitudinal dimension of the items that are being transferred on the conveyors. The indexing assembly further includes members for mounting the transfer assembly adjacent to the first conveyor and a drive mechanism for driving the transfer assembly to move the lugs at a speed less than the speed of the first conveyor. Each of the lugs has an engaging member and a weighted portion for pivoting the lugs as they travel on the transfer assembly so that the engaging member can engage a leading edge of an item while it is moving on the first conveyor to catch the item and separately deliver that item to the lifting assembly.

Advantageously, the indexing and lifting apparatus of the present invention is particularly well suited to high speed operation of first and second conveyors. Further, the indexing and lifting apparatus is particularly suited for items with sides that are perpendicular to their bottoms, thus providing a leading edge for engaging the indexing lugs and the stops in the trailing posts of the lifting assembly.

One of the features of the present invention is that the indexing assembly serves to prime the lifter assembly between gaps in the flow of items along the first conveyor. However, it is also a feature of the present invention that the lifting assembly can be used by itself without the indexing assembly to index and lift items. In this later mode of operation, the lifting assembly can be primed by the use of a control system and electric eyes to ensure a constant flow of items onto the lift assembly.

Additional objects, features and advantages of the invention will become apparent to those skilled in the art upon consideration of the following detailed description of preferred embodiments exemplifying the best mode of carrying out the invention as presently perceived.

DESCRIPTION OF THE DRAWINGS

The detailed description refers particularly to the accompanying drawing figures in which.

DETAILED DESCRIPTION OF THE DRAWINGS

In some applications for conveyor systems it is desirable that items randomly placed on the conveyor system be indexed so that they can be separately and timely delivered in sequence with a desired spacing therebetween. Further, it is desirable that the items be transferred from one conveyor to another conveyor where the two conveyors are located in planes at different levels. As the items are being transferred from one of the conveyors to the other conveyor, it is desirable that the items be indexed to maintain a desired spacing therebetween and to ensure that the items are timely and separately delivered to the second conveyor. One such application is in the area of packaging of food where open containers having bottoms and generally perpendicular side walls are randomly placed on a first conveyor and are filled with food and sealed on a second conveyor. In this application, the containers have non-interlocking side walls and the speed of movement of the first conveyor and second conveyor in addition to the operation of the fillers and sealing devices is usually rapid. A random indexing and lifting apparatus is provided in accordance with the present invention for use in such applications.

Generally speaking, the random indexing and lifting apparatus includes an indexing assembly and a lifting assembly wherein the lifting assembly can also function alone to index items in addition to lifting the items. Thus, it is possible that the lifting assembly of the random indexing and lifting apparatus can be used separately from the indexing assembly.

Figure 1:
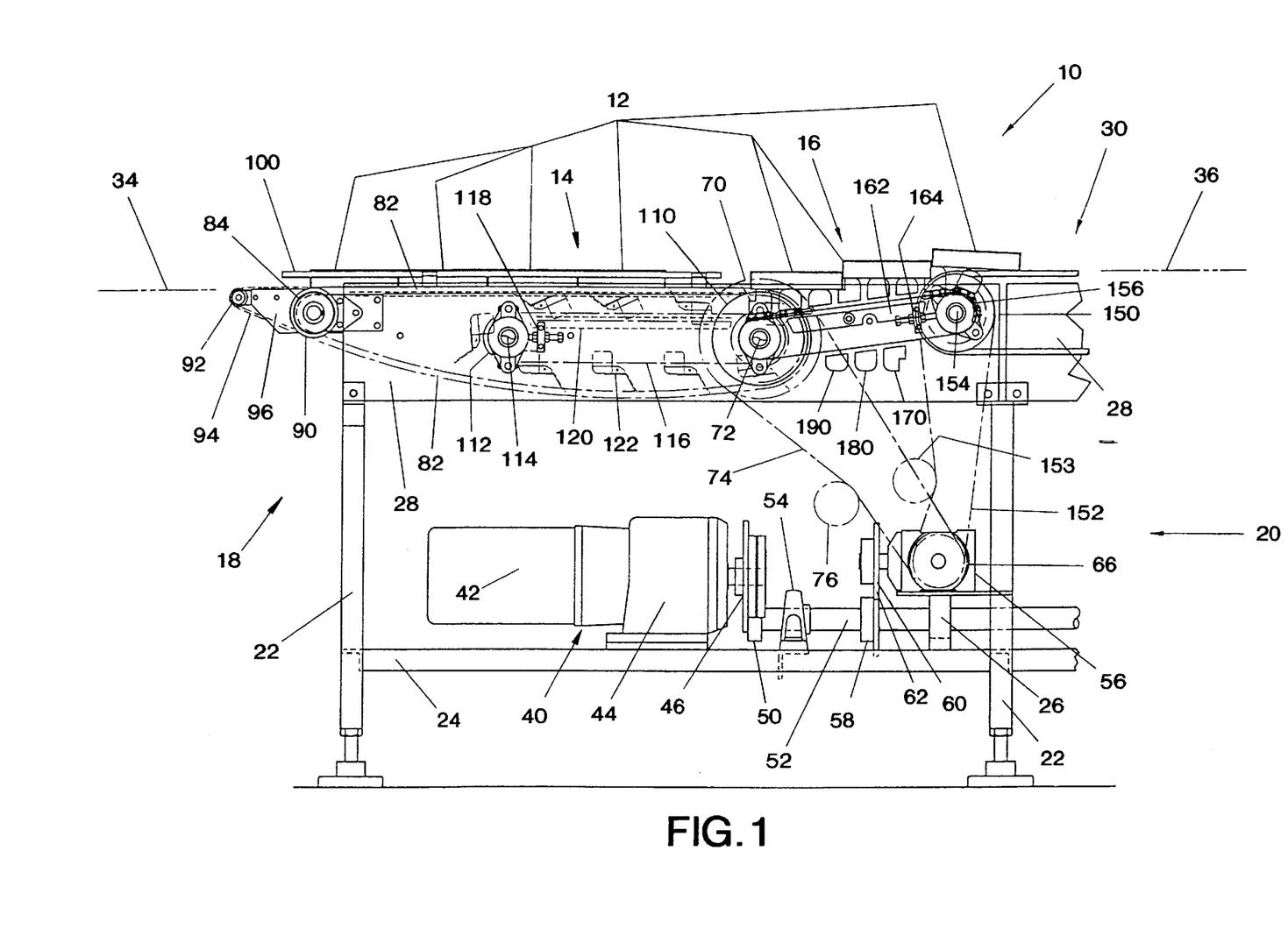
FIG. 1 is a side elevational view of a preferred embodiment of a random indexing and lifting apparatus in accordance with the present invention shown in combination with a first conveyor and a portion of a second conveyor.
Figure 2:
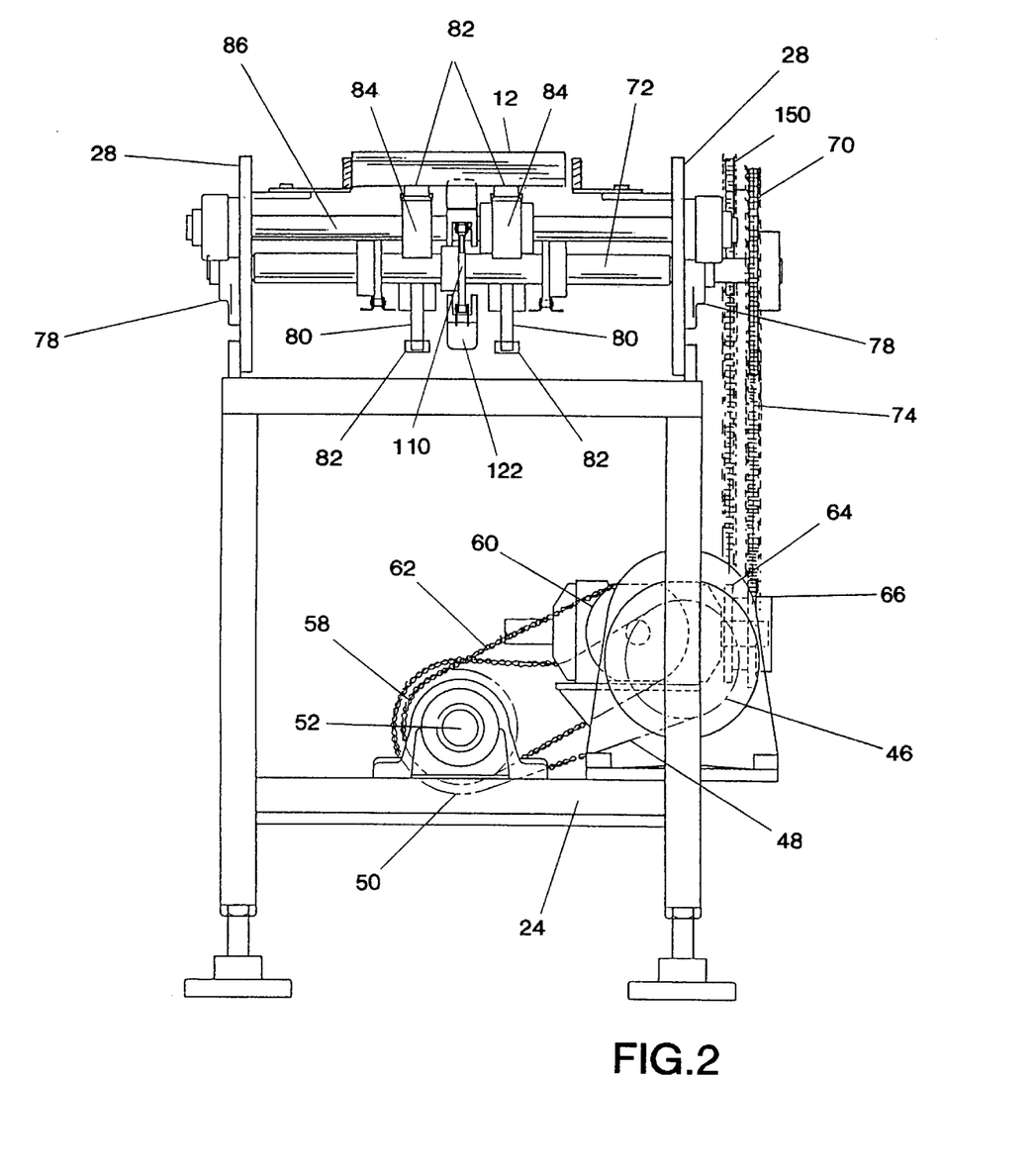
FIG. 2 is an end elevational view of the first conveyor and the random indexing and lifting apparatus shown in FIG. 1.
Figure 3:
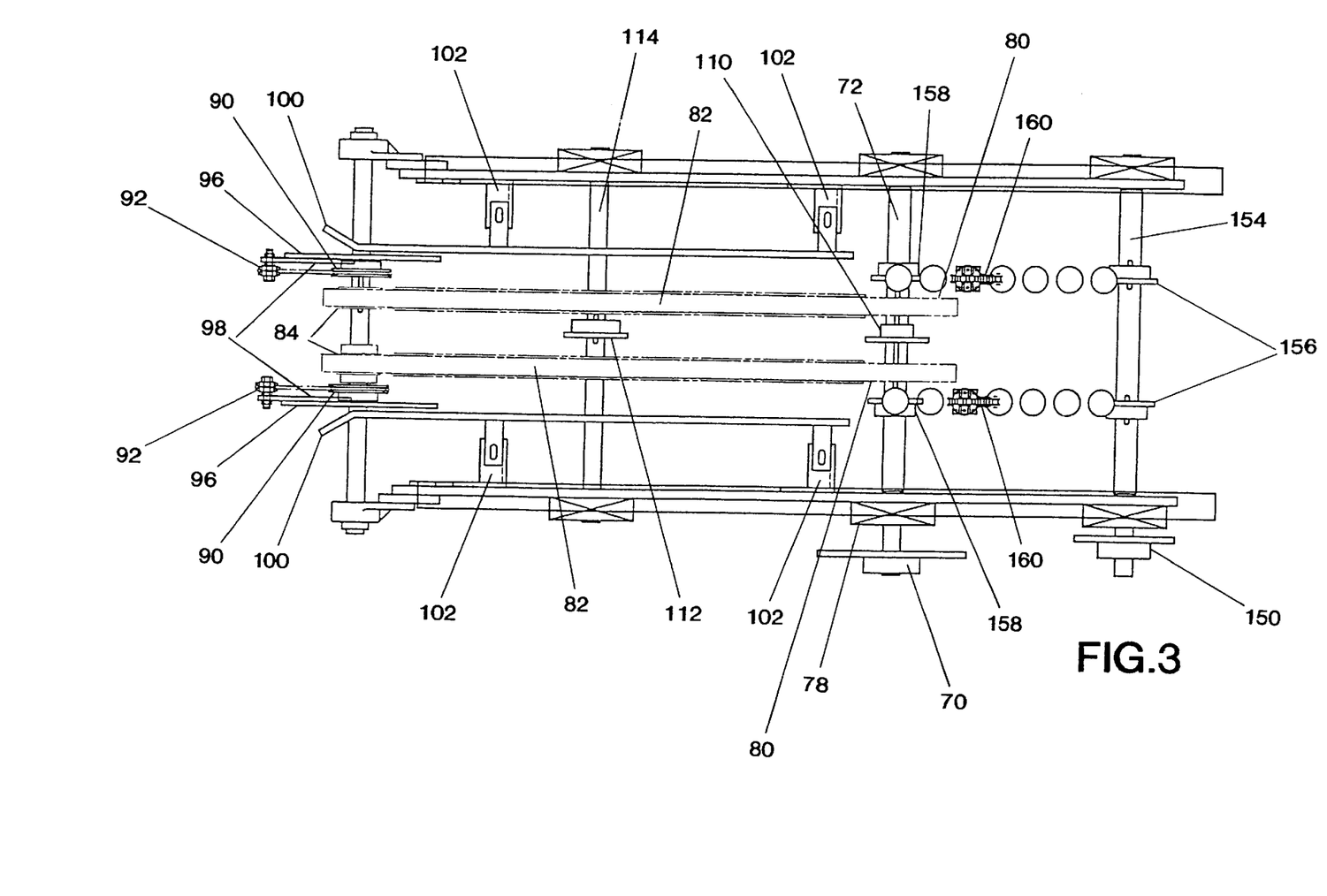
FIG. 3 is a top elevational view of the first conveyor and the random indexing and lifting apparatus shown in FIG. 1.

Referring to FIGS. 1, 2, and 3, a random indexing and lifting apparatus 10 in accordance with the present invention for indexing and lifting containers or items 12 is shown. The random indexing and lifting apparatus 10 includes an indexing assembly 14 and a lifting assembly 16.

A first conveyor 18 has a frame assembly 20 which includes legs 22 and cross members 24. The frame assembly 20 further includes a support 26 for supporting drive mechanisms for the first conveyor 18 and the random indexing and lifting apparatus 10. In addition, the frame assembly 20 includes side frame members 28 which provide structure for mounting various components of the first conveyor 18 and the random indexing and lifting apparatus 10.

A second conveyor 30 includes a belt or chain 32 for conveying the containers 12 after they have been transferred from the first conveyor 18 by the random indexing and lifting apparatus 10. Although not shown, it will be understood that the second conveyor 30 and belt or chain 32 are driven by conventional drive mechanisms and are supported by additional side frame members 28 which can be connected to legs 22. As shown in FIG. 1, the first conveyor 18 is in a first plane 34 and the second conveyor section 30 is in a second plane 36 at a level higher than the first plane 34.

As best shown in FIGS. 1 and 2, a drive mechanism 40 for driving the first conveyor 18, the indexing assembly 14, and the lifting assembly 16 includes a motor 42 which may be a one horsepower motor available from Reliance Electric Company, Model No. P56H4517. The drive mechanism 40 further includes a reducer 44 having a 7.6 to 1 ratio available from Reliance Electric Company, Model No. M60431A1. As best shown in FIG. 2, a sprocket 46 is connected to reducer 44. A drive chain 48 engages sprocket 46 and a sprocket 50. Sprocket 50 is connected to a timing shaft 52 which extends the length of the first conveyor 18 and the second conveyor 30. The operation of the first conveyor 18, the random indexing and lifting apparatus 10, and the second conveyor 30 is derived from the timing shaft 52 so that movement of the various components of the conveyors 18, 30 and the indexing and lifting apparatus 10 are coordinated and timed relative to each other. One or more gearboxes 54 support the timing shaft 52 along its length.

Continuing to refer to FIGS. 1 and 2, a gearbox 56 is mounted on support 26 and is connected to the timing drive shaft 52 by sprocket 58, sprocket 60, and a chain 62. Sprockets 64 and 66 are also connected to gearbox 56 as best shown in FIG. 2 and are used to provide a driving connection between gearbox 56, the first conveyor 18, and the random indexing and lifting apparatus 10 as will be explained later.

A transfer assembly for moving the first conveyor 18 includes a drive sprocket 70 connected to an indexer drive shaft 72 which is rotatably mounted to the frame member 28, as best shown in FIGS. 2 and 3. A drive chain 74 engages sprocket 66 on gearbox 56 and sprocket 70 to drive sprocket 70 and indexer drive shaft 72. A take-up sprocket 76 is provided for adjusting the tension in the chain 74. Bearings 78 are mounted on frame members 28 to rotatably support the indexer drive shaft 72.

The first conveyor 18 includes two laterally spaced sprockets 80 mounted on indexer drive shaft 72 as best shown in FIG. 3. Two idler sprockets 84 are mounted on an idler shaft 86 positioned at the upstream end of the first conveyor 18. Two chains 82 engage sprockets 80 and 84 to provide a conveyor surface for the containers 12. The containers 12 are supported on chains 82 and moved on the first conveyor 18 as the chains 82 are driven by drive sprocket 70. Chains 82 are in the first plane 34 of the first conveyor 18.

Also mounted on the idler shaft 86 are two transfer drive pulleys 90. Two transfer idler pulleys 92 are mounted on the frame assembly 20 using transfer mounting plates 96 and transfer idler pulley mounting plates 98. Two transfer belts 94 engage the transfer drive pulleys 90 and the transfer idler pulleys 92 to provide an infeed drive mechanism for the containers 12 as they are initially fed onto the first conveyor 18. The containers 12 are transferred onto the first conveyor 18 by the transfer drive belts 94.

Also associated with the first conveyor 18 are guide rails 100, as best shown in FIG. 3, for retaining and guiding the containers 12 on the chains 82. Guide rails 100 limit lateral movement of the containers 12 relative to chains 82. Guide rail support members 102 are provided to mount guide rails on the frame members 28.

Referring now to FIGS. 1–4, a preferred embodiment of the indexing assembly 14 includes an indexer sprocket 110 mounted on the indexer drive shaft 72 and an indexer idler sprocket 112 mounted on an indexer idler shaft 114 which is supported by and mounted to the frame member 28. Indexer idler shaft 114 is mounted upstream on conveyor 18 from the indexer draft shaft 72. As shown in FIG. 2, indexer sprocket 110 and indexer idler sprocket 112 have diameters less than the diameter of sprocket 70. An indexer chain 116 engages the indexer sprocket 110 and the indexer idler sprocket 112 and is driven by the gearbox 56 and chain 74 engaging sprocket 70. A chain take-up block 118 is provided for adjusting the tension of the indexer chain 116. A chain support member 120 is mounted to frame member 28 and houses the upper horizontal portion of the indexer chain 116 a shown in FIG. 4.

As shown in FIG. 3, the indexer sprocket 110, indexer idler sprocket 112, and indexer chain 116 are positioned between the chains 82 of the first conveyor 18. The indexer sprocket 110, indexer idler sprocket 112, indexer idler shaft 114, and indexer chain 116 provide a transfer assembly for indexing assembly 14. The transfer assembly provides the means for moving a plurality of indexer lugs 122 which engage containers 12 moving on the first conveyor 18, as will be explained later.

Figure 4:
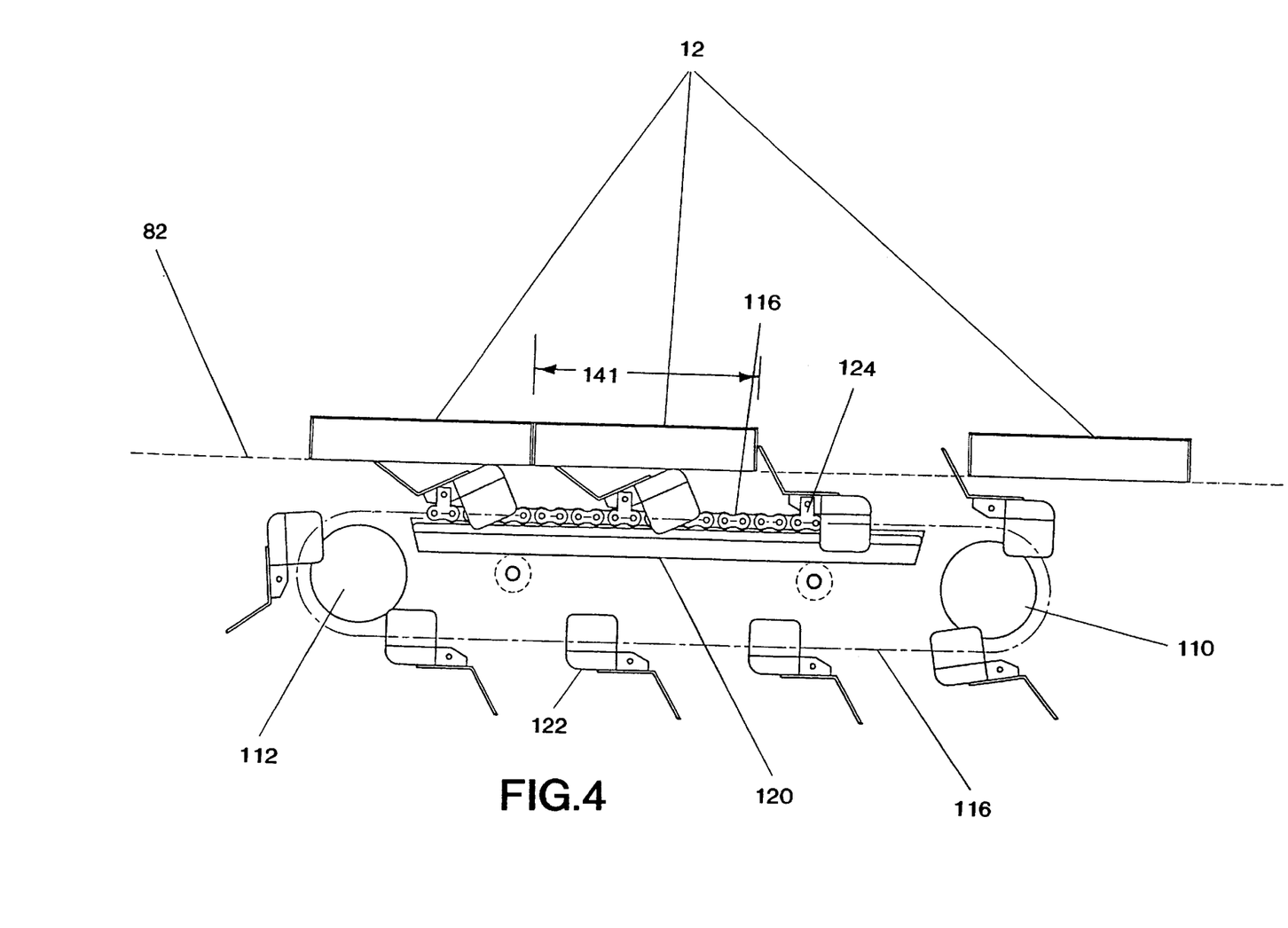
FIG. 4 is a diagrammatic view of an indexing assembly constructed in accordance with the present invention.
Figure 5:
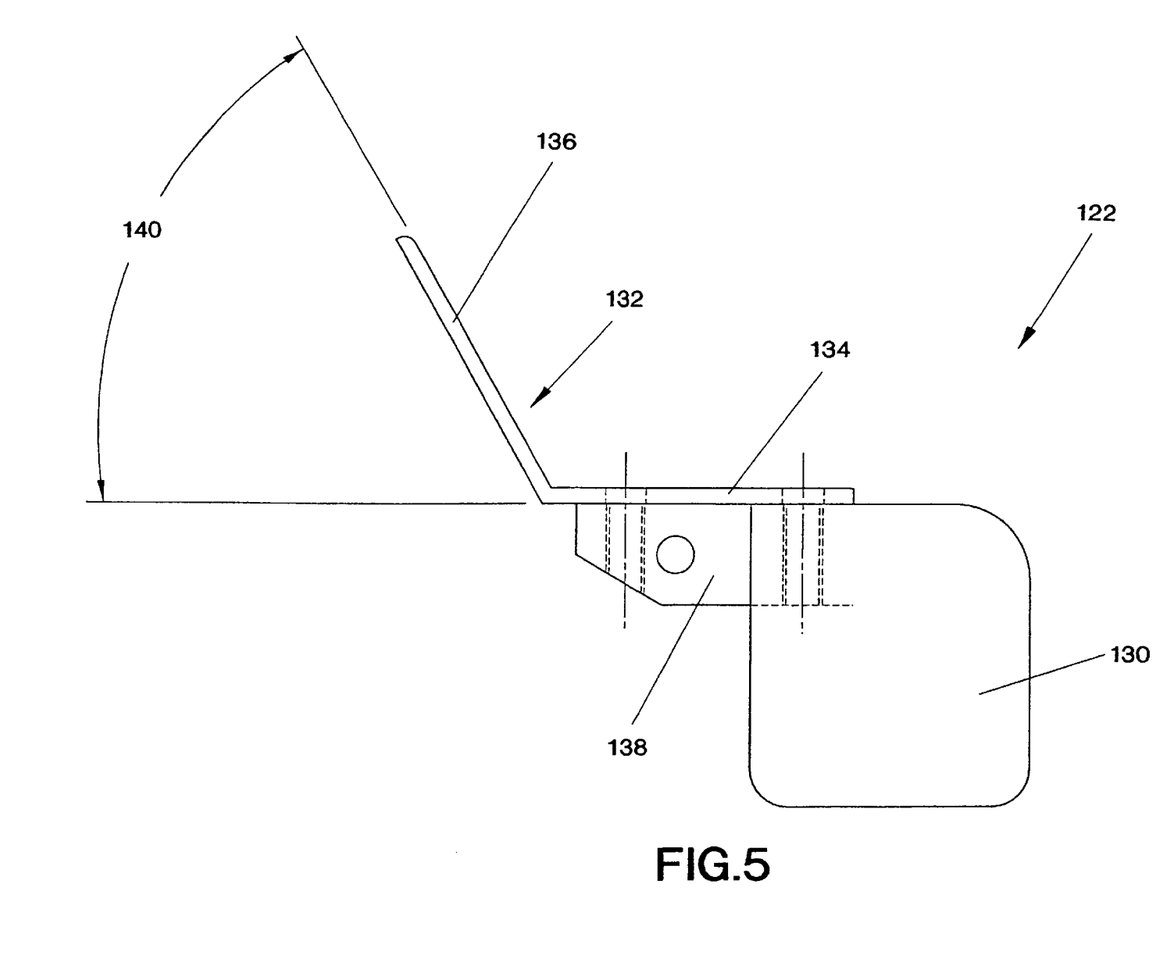
FIG. 5 is a diagrammatic view of an indexing lug forming part of the indexing assembly shown in FIG. 4.
Figure 6:
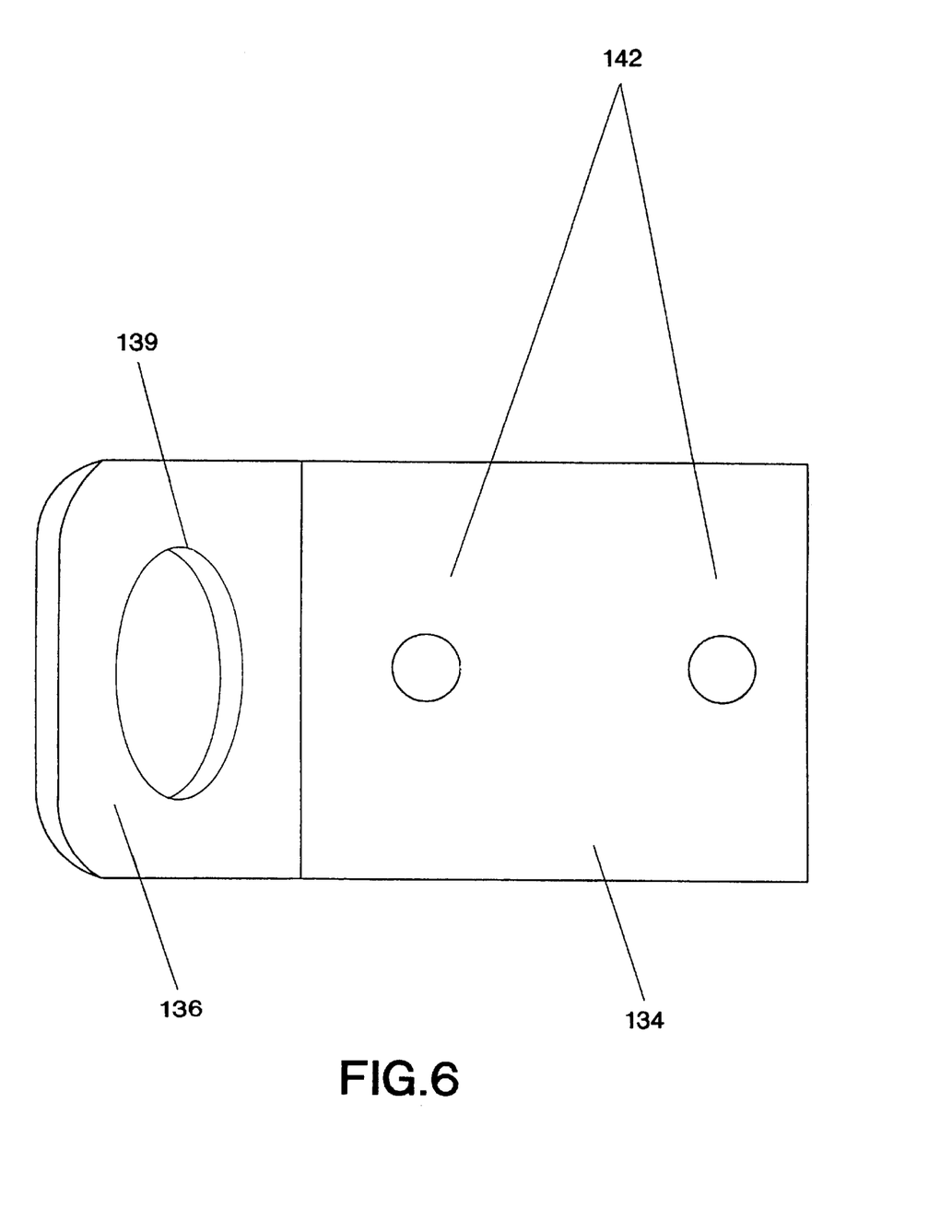
FIG. 6 is a top elevational view of an engaging member of the indexing lug shown in FIG. 5.

Referring to FIGS. 4–6, indexer chain 116 includes a plurality of lug-connecting chain links 124 for pivotally connecting the indexer lugs 122 to the transfer assembly. As best shown in FIGS. 5 and 6, each indexer lug 122 includes a weighted base portion 130 and an angularly upwardly extending container-engaging member 132. The container-engaging member 132 includes a base plate 134 and an angularly upwardly extending finger 136 for engaging the leading edge of containers 12. The indexer lug 122 also includes a mounting flange 138 for pivotally connecting the indexer lug 122 to a lug-connecting chain link 124. The angularly upwardly extending container-engaging finger 136 extends at an angle 140 of 60° from the base plate 134 of the lug 132. The angularly upwardly extending container-engaging finger 136 includes a circular opening 139 and the base plate 134 includes two mounting holes 142 for connecting the container-engaging member 136 to the weighted base portion 130.

The lug-connecting chain links 124 are positioned in the chain 122 such that the indexer lugs 122 are mounted to the chain 116 in spaced relationship at a distance between them that is less than the longitudinal length 141 of the containers 12 so that if a first container 12 engages an indexer lug 122 and a second container 12 is moving directly behind the first container 12, the next indexer lug 122 is folded down under the first container 12 and the subsequent indexer lug is folded down under the second container 12.

A preferred embodiment of the lifting assembly is best shown in FIGS. 1, 3, and 7–10. The lifting assembly includes a drive sprocket 150 which is connected to a lifter drive shaft 154. Lifter drive shaft 154 is supported by and mounted on frame member 28. A chain 152 engages drive sprocket 64 on gearbox 56 and engages drive sprocket 150 to drive lifter drive shaft 154. A take-up sprocket 153 is provided for adjusting the tension of the chain 152.

Two lifter drive sprockets 156 (as best shown in FIG. 3) are mounted on lifter drive shaft 154. Two lifter idler sprockets 158 are mounted on indexer drive shaft 72. Two lifter chains 160 engage the lifter drive sprockets 156 and lifter idler sprockets 158 so that, when sprockets 156, 158 are driven, lifter chains 160 serve to transfer the containers 12 from the first conveyor 18 to the second conveyor 30. Chain take-up blocks 164 are provided to adjust the tension of lifter chains 160. Lifter drive sprockets 156, lifter idler sprockets 158, and lifter chains 160 provide a lifter transfer assembly for transferring containers 12 from the first plane 34 of the first conveyor 18 to the second plane 36 of the second conveyor 30. Lifter guides 162 are mounted on frame member 28 adjacent the lifter chain 160 to house and guide the upper portion of lifter chains 160.

Figure 7:
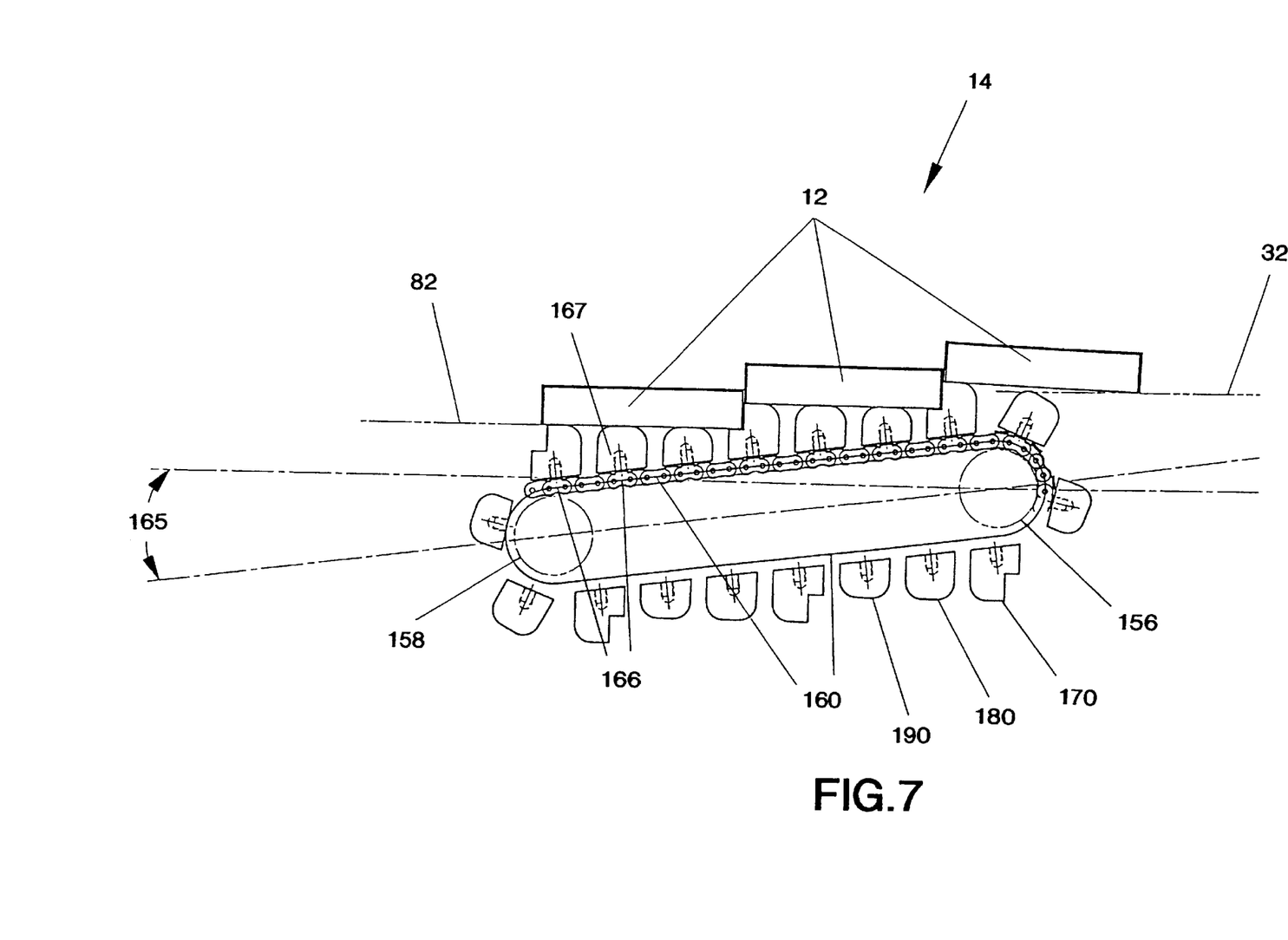
FIG. 7 is a diagrammatic view of a lifting assembly constructed in accordance with the present invention.

As best shown in FIGS. 1 and 7, the transfer assemblies comprising lifter drive sprockets 156, lifter idler sprockets 158, and lifter chains 160 are mounted on frame member 28 at an angle 165 with respect to the first plane 34 of the first conveyor 18 and the second plane 36 of the second conveyor 30. The angle 165 shown in FIG. 7 is 8°. Thus, containers 12 are lifted from the first plane 34 of the first conveyor 18 to the second plane 36 of the second conveyor 30. Second plane 36 is at a higher level than the first plane 34. It will be appreciated that the angle 165 will be determined by the difference in level between first plane 34 and second plane 36 and further by the distance between lifter drive sprockets 156 and lifter idler sprockets 158.

As shown in FIG. 7, the lifter chains 160 include connecting links 166 having threaded members 167 for use in connecting lifter posts 170, 180, and 190 to the transfer assembly. Lifter posts 170, 180, and 190 are configured such that when connected to the transfer assembly they support a container 12 in a plane that is parallel to the first plane 34 and second plane 36 as the containers are lifted from the first plane 34 to the second plane 36. Each container 12 is supported by a large lifter post 170, a medium lifter post 180, and a small lifter post 190.

Figure 8:
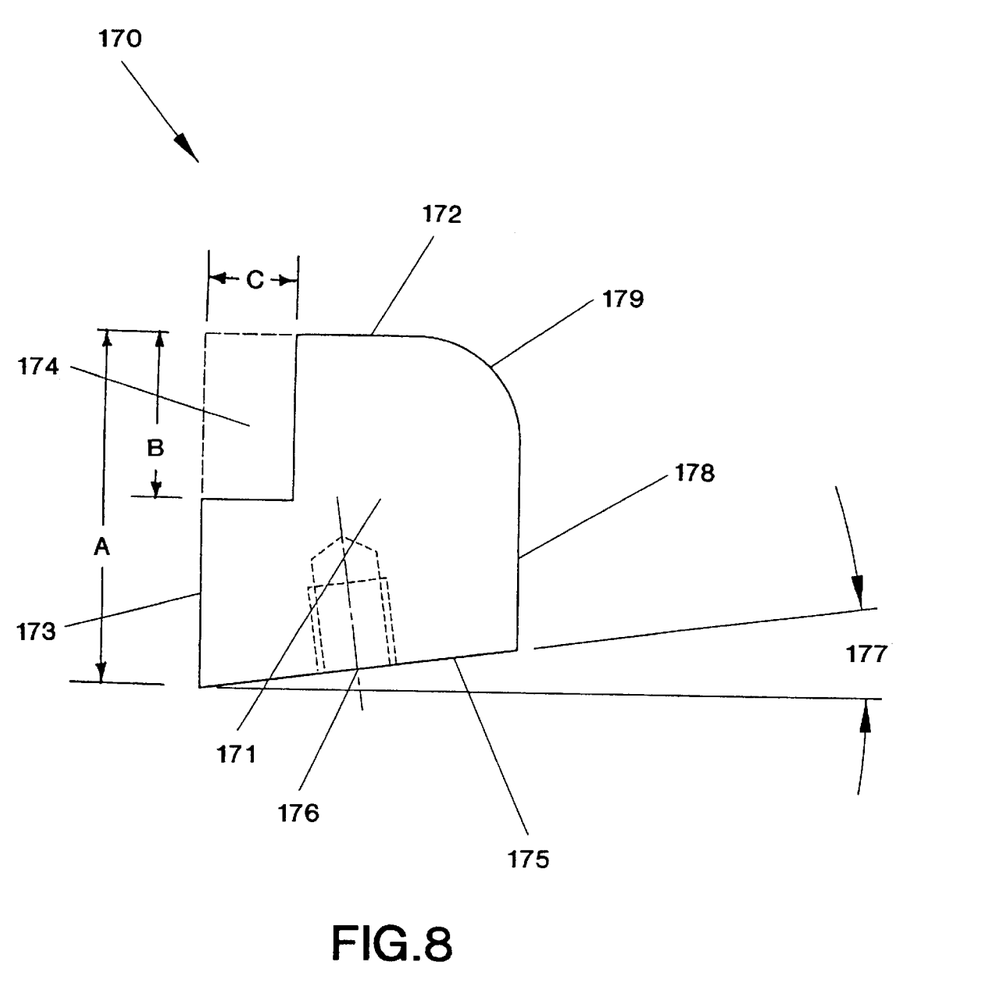
FIG. 8 is a diagrammatic view of a large post forming part of the lifting assembly shown in FIG. 7.

Large lifter post 170 is shown in FIG. 8 and includes a body 171 having a top side 172 which serves to support containers 12, a side 173 which is configured along with the top side 172 to provide a notch 174 for engaging a leading edge of a container 12. Notch 174 serves as a stop for a container 12 as will be explained later. Body 171 further includes a bottom side 175 having a threaded bore 176 formed therein for engaging a threaded member 167 of a post-connecting link 166. Bottom side 175 is formed at an angle 177 of 8° corresponding to angle 165 which is the angle at which the transfer assembly is mounted on the frame member 28. This similarity in angles permits the top side 172 of the large lifter post 170 to support the containers 12 in a plane parallel to the first plane 34 and second plane 36. It will be appreciated that in order for the post 170 to provide a surface for supporting the containers 12 in a plane parallel to the first plane 34 and the second plane 36, the angle 177 must be the same as or substantially the same as angle 165.

Body 171 further includes a side 178 which forms a curved corner 179 with top side 172 having a radius of ½ inch. All of the lifter posts 170, 180, and 190 have the same dimensions, except for their heights. In the case of large lifter post 170, height A is 1 11/16 inches in dimension. Notch 174 has a height B of 13/16 inch and a width C of 7/16 inch. It will be appreciated that the size of notch 174 may be different, depending upon the size of the containers 12 that are being transferred from first conveyor 18 to second conveyor 30.

Figure 9:
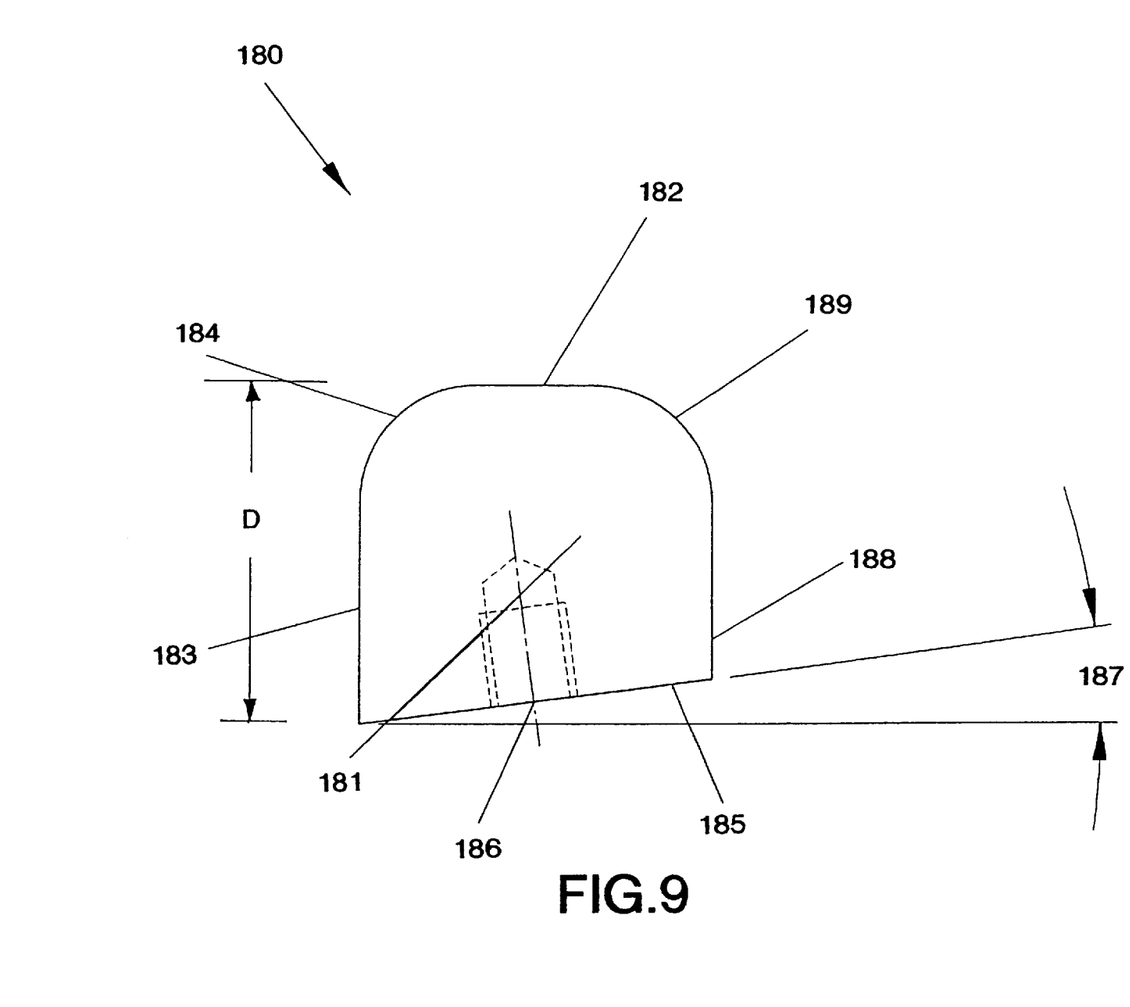
FIG. 9 is a diagrammatic view of a medium post forming part of the lifting assembly shown in FIG. 7.

Turning now to FIG. 9, the medium lifter post 180 includes a body 181 having a top side 182 and a side 183 which forms a curved corner 184 with top side 182 having a radius of ½ inch. Body 181 includes a bottom side 185 having a threaded bore 186 formed therein for engaging a threaded post-connecting link 166. Bottom side 185 is formed at an angle 187 of 8° corresponding to the angle 165 that the lifter transfer assembly is mounted on frame member 28. Side 188 of body 181 forms a curved corner 189 with top side 182 having a radius of ½ inch. The height D of the medium lifter post has a dimension of 1 7/16 inches. Again, it will be appreciated that angle 187 must be the same as or substantially the same as angle 165 in order for posts 170, 180, and 190 to support containers 12 in a plane substantially parallel to planes 34 and 36.

Figure 10:
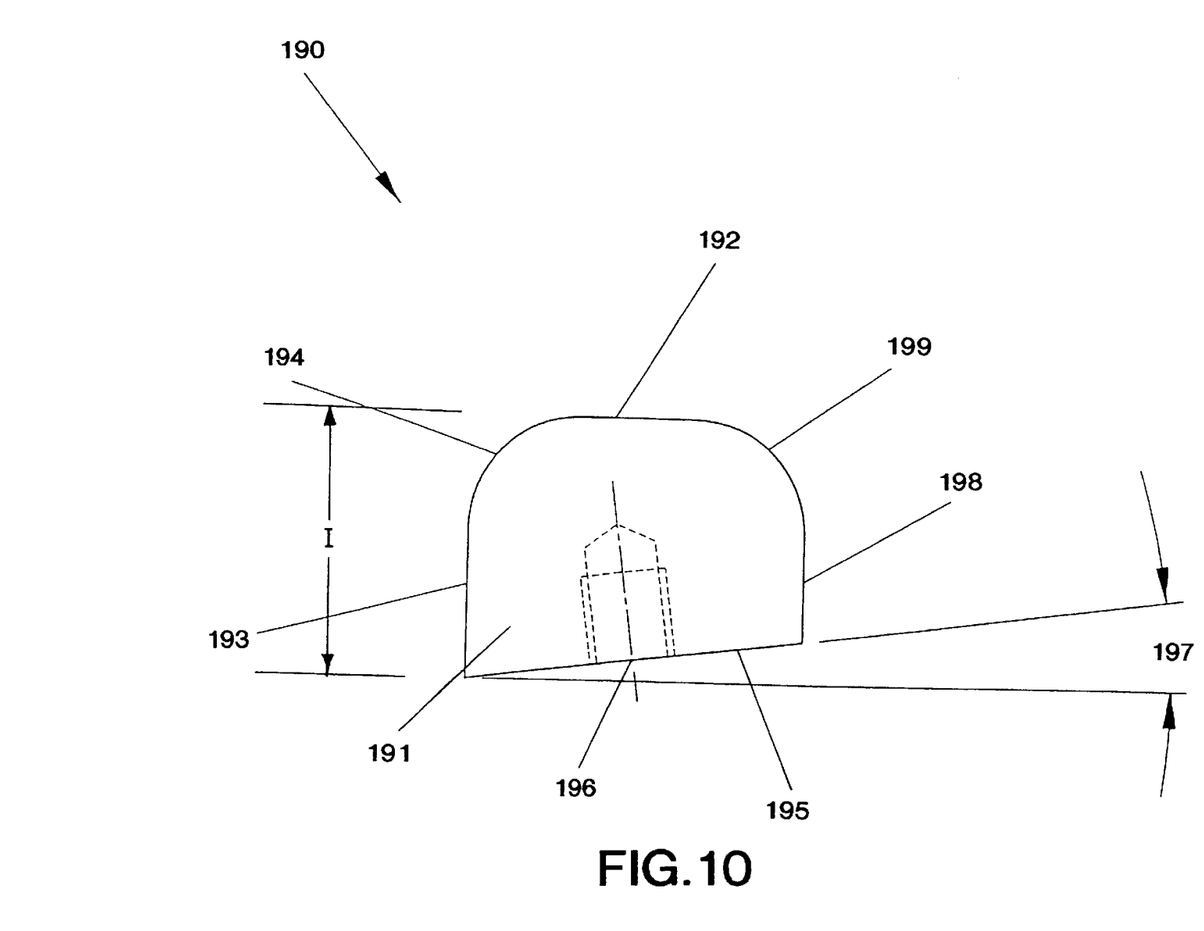
FIG. 10 is a diagrammatic view of a small post forming part of the lifting assembly shown in FIG. 7.

Referring to FIG. 10, the small lifter post 190 includes a body 191 having a top side 192 for supporting the containers 12 and a side 193 forming a curved corner 194 having a radius of ½ inch. Body 191 includes a bottom side 195 having a threaded bore 196 formed therein for engaging a threaded member 167 of a the post-connecting link 166. Bottom side 195 is formed at an angle 197 of 8° corresponding to the angle 165 that the lifter transfer assembly is mounted on frame members 28. Side 198 forms a curved corner 199 with top side 192 having a radius of ½ inch. The height E of small lifter 190 is 1 3/16 inches. Again, it will be appreciated that angle 197 must be the same as or substantially the same as angle 165 in order for posts 170, 180, and 190 to support containers 12 in a plane substantially parallel in planes 34 and 36.

It will be appreciated that the size of the containers 12 that are intended to be indexed and lifted using the random indexing and lifting apparatus 10 of the present invention will determine several dimensions of various elements of the random indexing and lifting apparatus 10. For example, the pivoting indexing lugs 122 are mounted on indexing chain 116 at a distance between them that is less than the length of the containers 12. Further, the dimensions of the lifting posts 170, 180, and 190 will be dictated by the size of containers 12. Further, it will be appreciated that the first conveyor 18 is moving at a speed that is faster than the speed of movement of the indexer lugs 122 and the lifter posts 170, 180, and 190.

The random indexing and lifting assembly of the present invention operates in the following manner. Items such as food containers 12 are fed onto the first conveyor 18 randomly with unequal spacing therebetween. Containers 12 are conveyed by conveyor 10 in the first plane 34. In many applications of conveyor systems, it is necessary that containers 12 be indexed before delivery to a processing step. As the indexer transfer assembly of indexing assembly 14 moves, indexer lugs 122 rise above the first plane 34 of the first conveyor 18. As an indexer lug 122 comes around the indexer idler sprocket 112, the weighted portion 130 of the indexer lug 122 causes the indexer lug 122 to pivot and the container-engaging member 136 to move upwardly and rise above the first plane 34. As containers 12 approach the container-engaging member 136, the leading edge of a first container 12 engages the container-engaging member 136 of lug 122 as shown in FIGS. 1 and 4. Since first conveyor 18 is moving at a faster speed than indexer lugs 122, containers 12 catch up to the container-engaging member 136 which is above the first plane 34 so that the leading edge of the first container 12 engages the engaging member 136 of indexer lug 122 and the first container 12 is caught.

As shown in FIGS. 1 and 4, if an indexer lug 122 comes around the idler sprocket 112 and a container 12 is above the indexer lug 122, the weight of the container 12 will keep the indexer lug 122 folded down and the container 12 will pass over the indexer lug 122 as it is delivered on the first conveyor 18. In other words, containers 12 will continue to move on the first conveyor 18 until such time as the leading edge of a first container 12 engages an indexing lug which has its container-engaging portion 136 above the first plane 134. As a first container 12 is caught by an indexing lug 122 and a subsequent container 12 presses against the first container 12, it can be seen in FIGS. 1 and 4 that trailing indexing lugs 122 are folded down under the first container 12 and the containers 12 immediately behind the fist container 12. Thus, all of the containers 12 lined up behind the first container 12 that is caught will move at the speed of the indexing lugs 122. Because the speed of the first conveyor 18 is greater than the indexing lugs 122, the first container 12 will always be forced against the container-engaging portion 136 projecting above the first plane 34.

As the indexer lug 122 holding the first container 12 moves around the indexer drive sprocket 110, it releases the first container 12. The released container 12 and all of those behind it will accelerate to the speed of the first conveyor 18 until such time as the leading container runs into the notch 174 of a large lifter post 170 which serves as a stop for the first released container 12. The three lifting posts 170, 180, and 190 support the first container 12. The angles 165 and 177, 187, and 197 are such that the container is supported by the lifting post in a plane that is parallel to the first plane 34 and the second plane 36. Subsequent containers 12 following the first container 12 will engage the notches 174 of subsequent lifter post 170 as they round the lifter idler sprockets 158.

On the lifting assembly 16, the containers 12 are indexed and lifted to second conveyor 30. As the lifting posts 170, 180, and 190 rise, they lift the containers 12 from the first plane 34 of the first conveyor 18 to the second plane 36 of the second conveyor 30. Once a container reaches the top of the lifting assembly 16, it is transferred to the second conveyor 30 which moves containers 12 at the speed of the second conveyor 30. Containers 12 are delivered onto the second conveyor separately at the desired time and spacing therebetween for further processing downstream on the second conveyor 30.

It will be appreciated that the indexing assembly 14 serves to prime the lifting assembly 16 to avoid gaps in the flow of containers 12 on the first conveyor 18. Further, it will be understood that the lifting assembly 16 also indexes the container 12 and therefore may be used without the indexing assembly 14 by hand-priming the lifting assembly 16. Through conventional control means including an electric eye, the drive of the lifting assembly 16 can be controlled so as not to allow the backlog of containers 12 be depleted.

Although the invention has been described in detail with respect to a certain preferred embodiment, variations and modifications exist within the scope and spirit of the invention as defined in the following claims.

I claim:

1. An apparatus for indexing and lifting items from a first conveyer in a first plane and transferring such items to a second conveyor in a second plane at a different level than the first plane, the apparatus comprising a transfer assembly for moving the items longitudinally from the first conveyer to the second conveyer, at least two longitudinally spaced-apart posts each having a top surface the transfer assembly delivering items to the second conveyor so that the top surfaces of the at least two posts cooperate to support an item, connectors for connecting the posts to the transfer assembly, frame members for mounting the transfer assembly between the first and second conveyers at an angle relative to at least one of the first and second planes, the posts being configured so that when the transfer assembly is mounted at the angle the top surfaces are in a single plane which is parallel to at least one of the first and second planes of the first and second conveyors, a drive mechanism for driving the transfer assembly to move the items from the first conveyor to the second conveyor while maintaining the items parallel to one of the first and second planes.

2. The apparatus of claim 1 wherein at least one of the posts includes a stop generally perpendicular to at least one of the first and second planes for engaging a leading edge of an item to index items on the posts as they move from the first conveyor onto the top surfaces of the posts.

3. The apparatus of claim 2 wherein the stop is a notch in a trailing post for receiving the leading edge of an item trailing the item being supported on the top surface of such trailing post.

4. The apparatus of claim 2 wherein each of the posts has one side formed at an angle that is substantially equal to the angle the transfer assembly is mounted between the first and second conveyors so that the top surfaces of the posts are in the single plane parallel to at least one of the first and second planes as the items are transferred from the first conveyor to the second conveyor.

5. The apparatus of claim 1 wherein the transfer assembly moves the items at a speed less than the speed of movement of at least one of the first and second conveyors.

6. An apparatus for indexing and lifting items from a first conveyor in a first plane and transferring such items to a second conveyor in a second plane at a different level than the first plane, the apparatus comprising a first transfer assembly, a plurality of lugs, pivot connectors for pivotally connecting the lugs to the first transfer assembly, the lugs being connected to the first transfer assembly in a spaced relationship less than a longitudinal dimension of the items, frame members for mounting the first transfer assembly adjacent to the first conveyor, a first drive mechanism for driving the first transfer assembly to move the lugs at a speed less than the speed of the first conveyor, each lug having an engaging member and a weighted portion for pivoting the lug so that the engaging member rises above the first plane to engage a leading edge of an item while it is on the first conveyor to catch the item, and a lifting assembly for lifting and transferring the items caught by the lugs from the first plane of the first conveyor to the second plane of the second conveyor.

7. The apparatus of claim 6, wherein the lifting assembly includes a second transfer assembly for moving the items from the first conveyor to the second conveyor, at least two posts each having a top surface for supporting an item, connectors for connecting the posts to the transfer assembly, frame members for mounting the transfer assembly between the first and second conveyors at an angle relative to at least one of the first and second planes, the posts being configured so that when the transfer assembly is mounted at the angle the top surfaces are in a single plane which is parallel to at least one of the first and second planes of the first and second conveyors, a drive mechanism for driving the transfer assembly to move the items from the first conveyor to the second conveyor while maintaining the items parallel to the first and second planes.

8. The apparatus of claim 7 wherein at least one of the posts includes a stop for engaging a leading edge of an item to index items on the posts as they move from the first conveyor onto the top surfaces of the posts.

9. The apparatus of claim 8 wherein the stop is a notch in a trailing post for receiving the leading edge of an item trailing the item being supported on the top surface of such trailing post.

10. The apparatus of claim 7 wherein the transfer assembly moves the items at a speed less than the speed of movement of at least one of the first and second conveyors.

11. The apparatus of claim 8 wherein each of the posts has one side formed at an angle that is substantially equal to the angle the transfer assembly is mounted between the first and second conveyors so that the top surfaces of the posts are in the single plane parallel to at least one of the first and second planes as the items are transferred from the first conveyor to the second conveyor.

12. An apparatus and indexing and lifting items from a first conveyor in a first plane and transferring such items to a second conveyor in a second plane at a different level than the first plane, the apparatus comprising an indexing assembly for indexing items on the first conveyor and delivering the items at desired intervals, a lifting assembly for lifting the indexed items from the first plane of the first conveyor to the second plane of the second conveyor, the lifting assembly including a transfer assembly for transferring the items from the first conveyor to the second conveyor, at least two posts each having a top surface for supporting the items, connectors for connecting the posts to the transfer assembly, frame members for mounting the transfer assembly between the first and second conveyors at an angle relative to at least one of the first and second planes, the posts being configured so that the top surface are in a single plane which is parallel to at least one of the first and second conveyors, a drive mechanism for driving the transfer assembly to move the items supported on the posts from the first conveyor to the second conveyor while maintaining them parallel to at least one of the first and second planes.

13. The apparatus of claim 12 wherein at least one of the posts includes a stop for engaging a leading edge of an item to index items on the posts as they move from the first conveyor onto the top surfaces of the posts.

14. The apparatus of claim 13 wherein the stop is a notch in a trailing post for receiving the leading edge of an item trailing the item being supported on the top surface of such trailing post.

15. The apparatus of claim 12 wherein the transfer assembly moves the items at a speed less than the speed of movement of at least one of the first and second conveyors.

16. The apparatus of claim 13 wherein each of the posts has one side formed at an angle that is substantially equal to the angle the transfer assembly is mounted between the first and second conveyors so that the top surfaces of the posts are in the single plane parallel to at least one of the first and second planes as the items are transferred from the first conveyor to the second conveyor.

* * * * *